(12) United States Patent
Zahnen et al.

(10) Patent No.: US 7,164,079 B2
(45) Date of Patent: Jan. 16, 2007

(54) PREFERENTIAL SEPARABLE OVERHEAD ELECTRIC SERVICE DROP AND ASSOCIATED METHOD

(75) Inventors: James L. Zahnen, Ormond Beach, FL (US); Paul W. Lubinsky, Palm Coast, FL (US)

(73) Assignee: Homac Mfg. Company, Ormond Beach, FL (US)

( * ) Notice: Subject to any disclaimer, the term of this patent is extended or adjusted under 35 U.S.C. 154(b) by 176 days.

(21) Appl. No.: 11/039,513

(22) Filed: Jan. 19, 2005

(65) Prior Publication Data

US 2005/0157449 A1    Jul. 21, 2005

Related U.S. Application Data

(60) Provisional application No. 60/538,093, filed on Jan. 21, 2004.

(51) Int. Cl.
*H02G 7/08* (2006.01)
(52) U.S. Cl. .................. 174/44; 174/40 CC; 174/43; 248/61
(58) Field of Classification Search ......... 174/40 CC, 174/40 R, 40 TD, 41, 43, 44, 45 R, 45 TD; 439/101, 108, 289, 296, 299, 301, 345, 346, 439/352, 369; 228/148, 161; 361/79, 107; 248/61, 63, 64; 403/2, 41, 78; 385/136
See application file for complete search history.

(56) References Cited

U.S. PATENT DOCUMENTS

| | | | |
|---|---|---|---|
| 2,499,709 A | 3/1950 | Whitman et al. ............. 174/44 |
| 3,430,330 A | 3/1969 | Garner ....................... 29/429 |
| 3,761,865 A * | 9/1973 | Bomgaars et al. ........ 174/40 R |
| 4,195,192 A * | 3/1980 | Hackney et al. .......... 174/40 R |
| 4,616,103 A * | 10/1986 | Balteau ................. 174/40 TD |
| 5,315,064 A * | 5/1994 | Andrews ............... 174/40 TD |
| 5,623,122 A * | 4/1997 | Anderson et al. ....... 174/40 TD |
| 5,758,005 A * | 5/1998 | Yoshida .................... 174/40 R |
| 5,898,558 A | 4/1999 | Ostendorp .................. 361/107 |
| 6,111,193 A * | 8/2000 | Auclair et al. ................ 174/44 |
| 6,245,991 B1 * | 6/2001 | Ryan ..................... 174/40 TD |
| 6,971,898 B1 * | 12/2005 | Ostendorp .................. 439/301 |
| 2005/0130465 A1 | 6/2005 | Ostendorp .................... 439/91 |

* cited by examiner

*Primary Examiner*—Dean A. Reichard
*Assistant Examiner*—Adolfo Nino
(74) *Attorney, Agent, or Firm*—Allen, Dyer, Doppelt, Milbrath & Gilchrist, P.A.

(57) ABSTRACT

An overhead service drop extending between a utility pole and a customer location includes at least one power conductor, a neutral conductor messenger supporting itself and the power conductor, and a separable power connector between the power conductor and a corresponding utility power conductor adjacent the utility pole. The overhead service drop further includes a separable neutral connector between the neutral conductor messenger and a corresponding utility neutral conductor, and a mechanical breakaway member between the neutral conductor messenger and the utility pole. The mechanical breakaway member breaks away prior to breakage of the neutral conductor messenger to permit preferential separation of the separable power and neutral connectors based upon increased tension imparted to the neutral conductor messenger by a falling object.

27 Claims, 3 Drawing Sheets

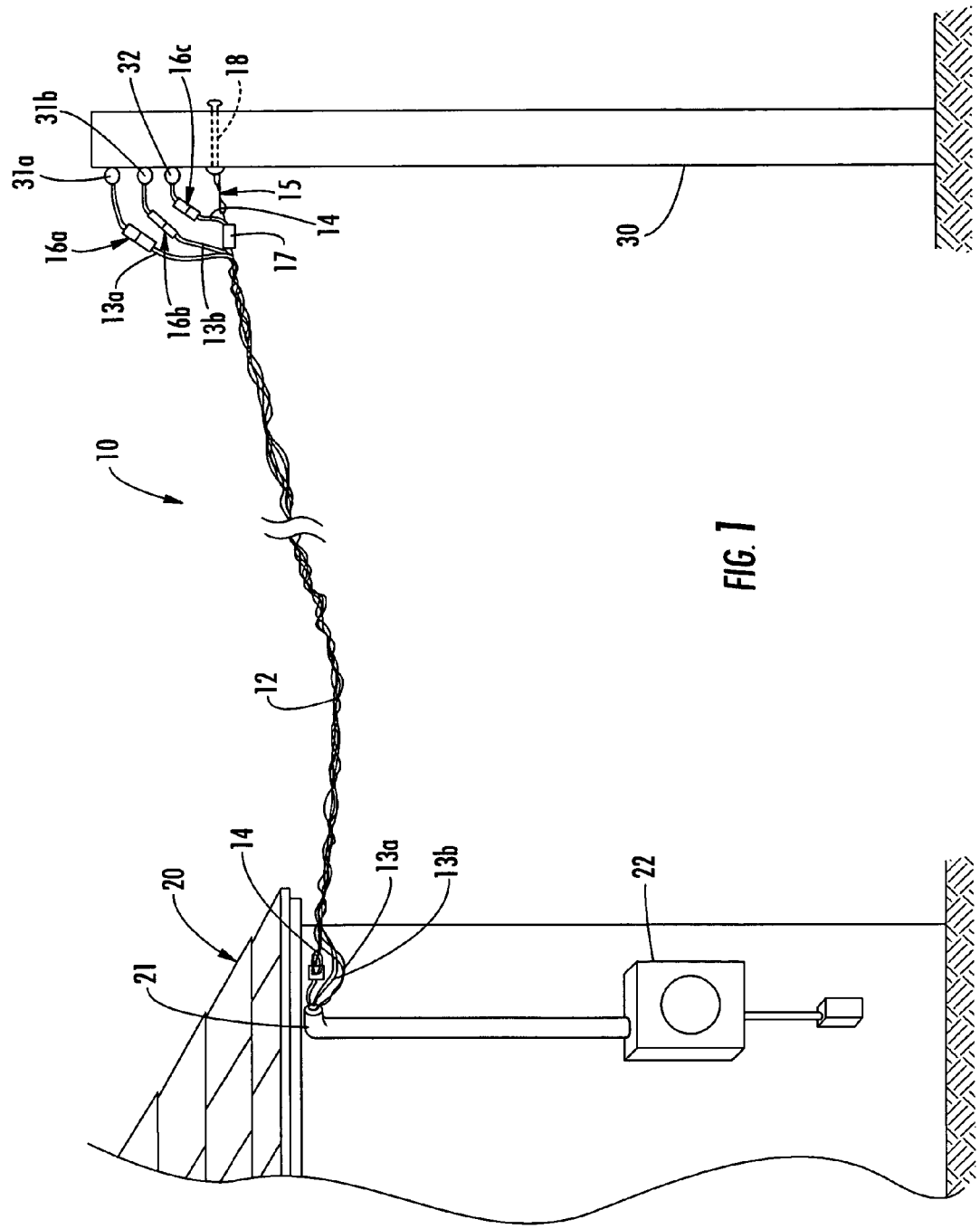

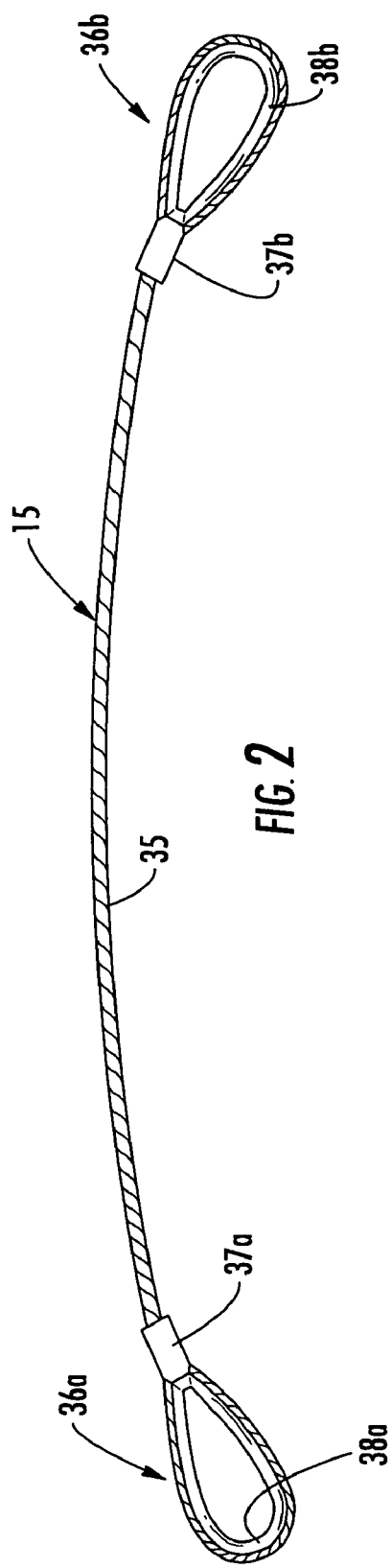
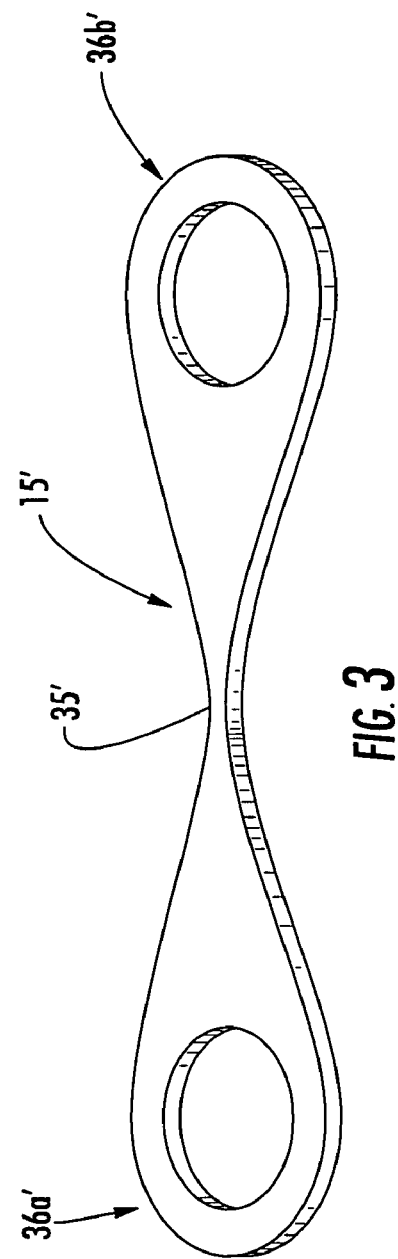

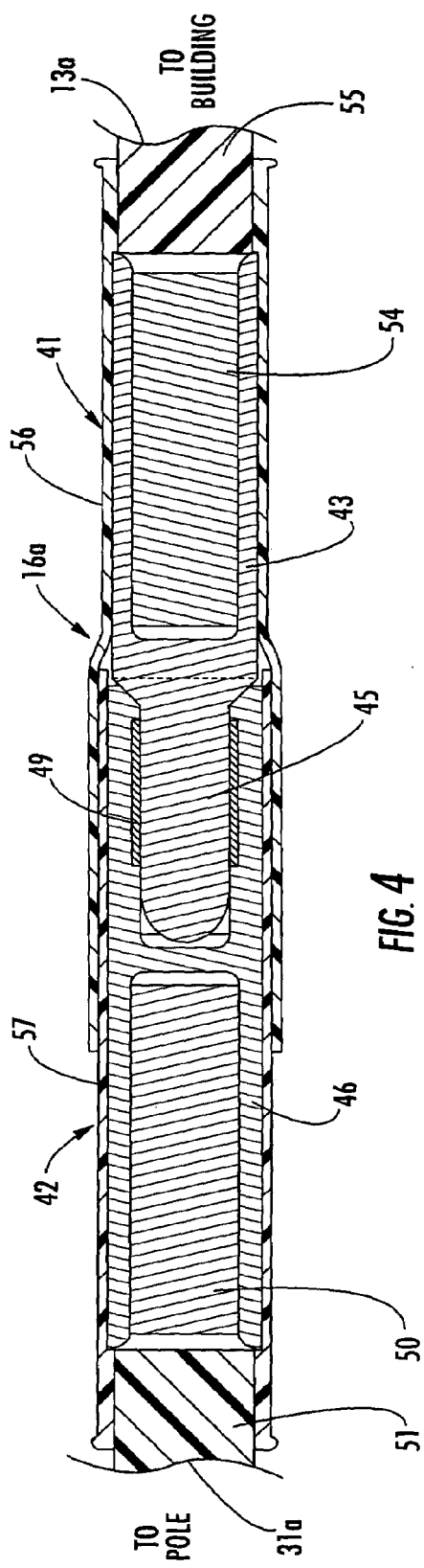
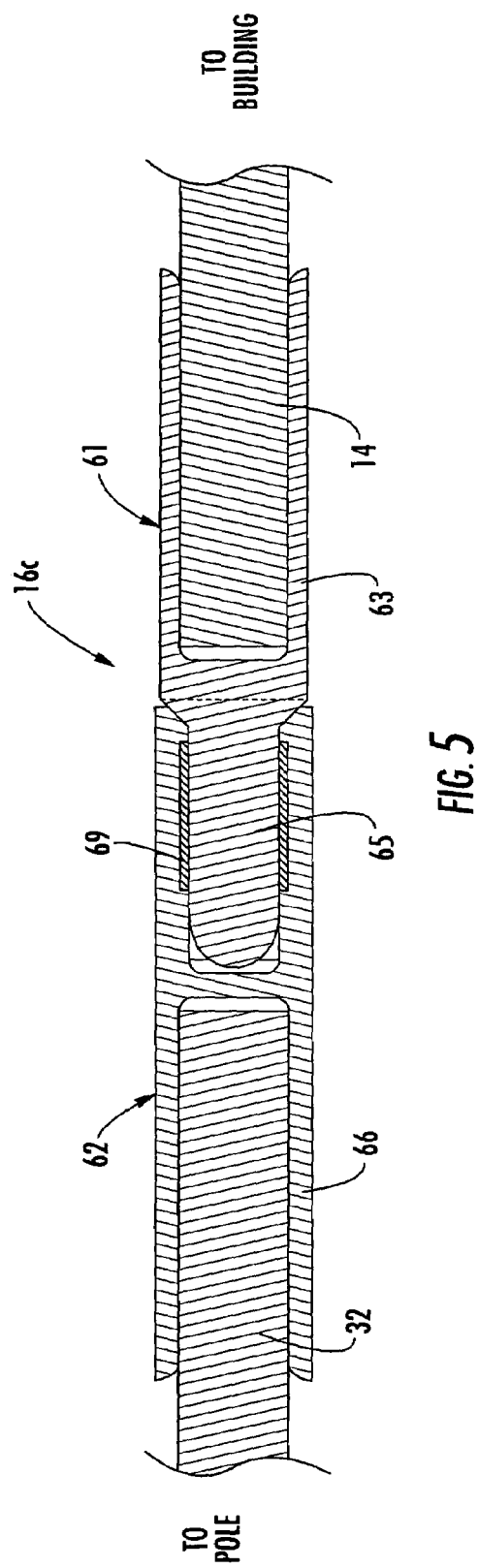

PREFERENTIAL SEPARABLE OVERHEAD ELECTRIC SERVICE DROP AND ASSOCIATED METHOD

RELATED APPLICATION

This application is based upon prior filed copending provisional application Ser. No. 60/538,093 filed Jan. 21, 2004, the entire subject matter of which is incorporated herein by reference in its entirety.

FIELD OF THE INVENTION

The invention relates to the field of electrical power, and, more particularly, to an overhead electric service drop and associated method.

BACKGROUND OF THE INVENTION

Electrical power is typically supplied to a customer's home or business by an overhead service drop. The service drop typically includes a plurality of electrical conductors extending from a nearby utility pole to an anchor point at the customer's location. For example, a triplex drop includes a neutral conductor and a pair of insulated conductors wound around the neutral conductor. The neutral conductor is mechanically tied to the pole and house by respective wedge clamps. The insulated conductors are hot or power wires, and the neutral conductor also serves as a messenger to mechanically support the triplex. For different types of electrical service, a quadraplex cable may be used including three power conductors and the neutral messenger, or a duplex cable may be used including the neutral messenger and a single power conductor.

Unfortunately, the overhead service drop is subject to being knocked down by trees or other falling debris, such as during a storm, for example. Oftentimes, the overhead service drop will pull lose from the customer's location. This leaves a potentially energized wire conductor on the ground and subject to contact by persons nearby. Damage may also occur to the building as the anchor is pulled therefrom. Of course, the overhead service drop may also pull lose from the pole thereby causing damage to the utility transformer or distribution line, for example.

Accordingly, it has been proposed to engineer the overhead service drop so that a falling tree will cause the end of the service drop closest to the utility pole to preferentially separate. This leaves a relatively short section of potentially energized cable at the pole. In addition, damage at the building and/or at the utility pole may also be avoided.

For example, U.S. Pat. No. 2,499,709 to Whitman et al. discloses such a preferential breakaway overhead service drop. A shear pin is used to join two connector portions adjacent the utility pole for the self-supporting, power conductors. The shear pin is sized to sever and release the self-supporting overhead service conductors adjacent the utility pole.

The Electric Power Research Institute is pursuing a similar technology wherein the conductors for three service drops are connected to busses within an overall enclosure. Female separable connector portions are attached to the buses within the housing. Male connector portions are coupled to the conductors of the service drop and then mated with the female connector portions in the housing. This arrangement may also permit the ready repair of the downed service line. In other words, a utility crew could more readily remate the connector portions, instead of repairing or replacing conductors and connectors, for example. The homeowner is typically responsible for repairs of any structural damage. In some storms, as many as ten thousand customers may experience an outage of the overhead service drop. Accordingly, if the rematable connector approach prevents damage to the building and facilitates quick restoration of service, customers and the utility company will benefit. Unfortunately, the proposed EPRI approach now services three houses and this requires that the overall housing be pivotable on the utility pole over a relatively large angle to permit release of service drops attached at an angle. This approach is also relatively complex and expensive.

SUMMARY OF THE INVENTION

In view of the foregoing background, it is therefore an object of the invention to provide an overhead service drop that provides preferential separation adjacent the utility pole, and wherein the separation force is accurate and reliable.

This and other objects, features, and advantages in accordance with the invention are provided by an overhead service drop extending between a utility pole and a customer location and including a mechanical breakaway member. More particularly, the overhead service drop may include at least one hot or power conductor, a neutral conductor messenger supporting itself and the at least one power conductor, and at least one separable power connector between the at least one power conductor and a corresponding at least one utility power conductor adjacent the utility pole. The overhead service drop may further include a separable neutral connector between the neutral conductor messenger and a corresponding utility neutral conductor adjacent the utility pole. The mechanical breakaway member may be between the neutral conductor messenger and the utility pole for breaking away prior to breakage of the neutral conductor messenger to permit preferential separation of the at least one separable power connector and the separable neutral connector based upon increased tension imparted to the neutral conductor messenger, such as by a falling object thereon. Accordingly, the overhead service drop provides preferential separation adjacent the utility pole, and wherein the separation force is accurate and reliable. Considered in other terms, the separable connectors and the mechanical breakaway member may be considered as a preferential separation assembly for the service drop.

The mechanical breakaway member may comprise an elongate member including opposing ends and a medial portion extending therebetween. The elongate member may comprise a stranded wire or solid body, for example. The solid body could comprise a stamped or machined metallic body or a plastic body. At least one of the opposing ends, and the medial portion may have a predetermined breaking strength, for example.

The at least one separable power connector may comprise male and female mating portions. The female mating portion of the at least one power conductor separable connector may be attached to the at least one power conductor. The female mating portion of the at least one power conductor separable connector may comprise a replaceable tubular contact.

Similarly, the separable neutral connector may comprise male and female mating portions. The female mating portion of the neutral conductor separable connector may also comprise a replaceable tubular contact. The at least one power conductor may comprise a pair of conductors supported by the neutral conductor messenger to define a triplex service cable, for example.

A method aspect of the invention is for installing an overhead service drop extending between a utility pole and a customer location. The overhead service drop may include at least one power conductor, and a neutral conductor messenger supporting itself and the at least one power conductor. The method may include connecting at least one separable power connector between the at least one power conductor and a corresponding at least one utility power conductor adjacent the utility pole, and connecting a separable neutral connector between the neutral conductor messenger and a corresponding utility neutral conductor adjacent the utility pole. The method may further include connecting a mechanical breakaway member between the neutral conductor messenger and the utility pole for breaking away prior to breakage of the neutral conductor messenger to permit preferential separation of the at least one separable power connector and the separable neutral connector based upon increased tension imparted to the neutral conductor messenger, such as by a falling object thereon.

BRIEF DESCRIPTION OF THE DRAWINGS

FIG. 1 is a schematic diagram of the preferential separable overhead service drop in accordance with the invention.

FIG. 2 is a side elevational view of an embodiment of the mechanical breakaway member as used in the overhead service drop as shown in FIG. 1.

FIG. 3 is a perspective view of another embodiment of a mechanical breakaway member as may used in the overhead service drop as shown in FIG. 1.

FIG. 4 is a cross-sectional view of a separable power connector as used in the overhead service drop as shown in FIG. 1.

FIG. 5 is a cross-sectional view of a separable neutral connector as used in the overhead service drop as shown in FIG. 1.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIG. 1, an overhead service drop 10 extends between a utility pole 30 and a customer location 20. The overhead service drop 10 illustratively includes a triplex cable 12 that, in turn, includes two power conductors 13a, 13b, and a neutral conductor messenger 14 supporting itself and the at least one power conductor. The side of the building 20 carries a weatherhead 21 that collects and routes the conductors to the power meter 22 as will be appreciated by those skilled in the art. The attachment or anchoring of the building end of the neutral conductor messenger 14 may be made using conventional hardware, such as a clevis fastener and neutral wedge as will also be understood by those skilled in the art.

The overhead service drop 10 further includes, separable power connectors 16a, 16b between the respective power conductors 13a, 13b and corresponding utility power conductors 31a, 31b adjacent the utility pole 30. And a separable neutral connector 16c is between the neutral conductor messenger 14 and a corresponding utility neutral conductor 32 adjacent the utility pole 30.

The overhead service drop 10 yet further includes a mechanical breakaway member 15 between the neutral conductor messenger 14 and the utility pole 30 for breaking away prior to breakage of the neutral conductor messenger to permit preferential separation of the separable power connectors 16a, 16b and the separable neutral connector 16c based upon increased tension imparted to the neutral conductor messenger, such as by a falling object thereon. Alternately, wind and/or ice loading may also cause increased tension on the neutral conductor messenger 14.

As will be appreciated by those skilled in the art, the end of the neutral conductor messenger 14 may be mechanically terminated in a wedge clamp 17 with a neutral conductor tail portion extending outwardly therefrom that goes to the separable neutral connector 16c. The wedge clamp 17, in turn, is connected, via the mechanical breakaway member 15, to an eyebolt 18 extending through the utility pole 30 in the illustrated embodiment. A similar eye, not shown, may be provided at the house or customer location 20 as will be understood by those skilled in the art.

Referring now additionally to FIG. 2, an embodiment of the mechanical breakaway member 15 is now described. The mechanical breakaway member 15 illustratively comprises an elongate member comprising opposing ends in the form of loops 36a, 36b and a medial portion in the form of a stranded wire 35 extending therebetween. At least one of the opposing end loops 36a, 36b and stranded wire 35 may have a predetermined breaking strength. The breakaway strength can be accurately set lower than the breaking strength of the neutral conductor messenger 14, for example, by selecting an appropriate diameter of the stranded wired 35. Of course in other embodiments, the breakaway strength could be determined by different material choices, and/or the configuration of the end opposing end loops 36a, 36b, for example. Indeed many other variations of mechanical breakaway members 15 are also contemplated by the invention.

Each opposing end loop 36a, 36b includes a respective crimped collar 37a, 37b to secure the free end of the stranded wire 35 in the loop configuration, for example. To resist wear of the stranded wire 35 at the respective opposing end loops 36a, 36b, a respective metallic loop liner 38a, 38b may also be provided as shown in the illustrated embodiment.

Referring now additionally to FIG. 3, another embodiment of a mechanical breakaway member 15' is now described. The mechanical breakaway member 15' illustratively comprises an elongate member comprising opposing ends in the form of loops 36a', 36b' and a medial portion in the form of a solid body 35' extending therebetween. In this embodiment, the center of the solid body 35' may have a reduced thickness to set a predetermined breaking strength as will be appreciated by those skilled in the art. The breakaway strength can be accurately set lower than the breaking strength of the neutral conductor messenger 14. Of course in other embodiments, the breakaway strength could be determined by different material choices, and/or the configuration of the end opposing end loops 36a', 36b', for example. The mechanical breakaway member 15' may comprise plastic or a metal, such as aluminum or stainless steel, for example. The mechanical breakaway member 15' may be formed by molding or stamping or other machining operations, for example, to give accurate control of the breaking strength as will be appreciated by those skilled in the art. As an example, the breaking strength may be set to 850 pounds, although the breaking strength may be tailored for different installations.

Referring now additionally to FIG. 4, a separable power connector 16a is now described. The separable power connector 16a comprises respective male and female mating portions 41, 42. The male portion 41 illustratively includes a body 43 having a hollow end to receive the power conductor 13a from the customer location 20, which includes a conductor 54 and a sheath thereon 55. At the opposite end, the body 41 carries a contact 45 that may be replaceable in some embodiments. An insulating layer 56 illustratively covers the body 43.

The female connector portion 42 includes a body 46 having a first hollow end to receive the utility power conductor 31a from the utility pole 30, for example. The utility power conductor 31a includes a conductor 50 and an insulating sheath 51 thereon. The second end of the body 46 is also hollow to receive the contact 45 of the male connector portion 41. The female connector portion 42 may also optionally carry a replaceable tubular contact 49 as will be appreciated by those skilled in the art. An insulating layer 57 illustratively covers the body 46. The female connector portion 42 may be connected to the utility power conductor 31a to reduce the likelihood of undesired contact with an energized conductor, as will be appreciated by those skilled in the art.

Referring now to FIG. 5, the separable neutral connector 16c is now described. The separable neutral connector 16c comprises respective male and female mating portions 61, 62. The male portion 61 illustratively includes a body 63 having a hollow end to receive the neutral conductor 14 from the wedge clamp 17. At the opposite end, the body 63 carries an optional replaceable neutral contact 65.

The female connector portion 62 includes a body 66 having a first hollow end to receive the utility neutral conductor 32 from the utility pole 30, for example. The second end of the body 66 is also hollow to receive the contact 65 of the male connector portion 61. The female connector portion 62 may also optionally carry a replaceable tubular contact 69 as will be appreciated by those skilled in the art. The separable neutral connector 16c does not include an insulating sheath in the illustrated embodiment.

The mechanical breakaway member 15, 15' separable power connectors 16a, 16b, and separable neutral connector 16c may be considered as defining a preferential separation assembly to permit the overhead service drop 10 to preferentially separate adjacent the utility pole 30 and be readily restored by utility crews.

A method aspect of the invention is for installing an overhead service drop extending between a utility pole and a customer location. The overhead service drop may include at least one power conductor, and a neutral conductor messenger supporting itself and the at least one power conductor, for example. The method may include connecting at least one separable power connector between the at least one power conductor and a corresponding at least one utility power conductor adjacent the utility pole, and connecting a separable neutral connector between the neutral conductor messenger and a corresponding utility neutral conductor adjacent the utility pole. The method may further include connecting a mechanical breakaway member between the neutral conductor messenger and the utility pole for breaking away prior to breakage of the neutral conductor messenger to permit preferential separation of the at least one separable power connector and the separable neutral connector based upon increased tension imparted to the neutral conductor messenger, such as caused by a falling object.

Although the primary application for the preferential separation assembly as described herein is at the utility pole side of the service drop, in other embodiments, the assembly may be used at the house or customer location as will be appreciated by those skilled in the art. According, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. An overhead service drop extending between a utility pole and a customer location comprising:
   at least one power conductor;
   a neutral conductor messenger supporting itself and said at least one power conductor;
   at least one separable power connector between said at least one power conductor and a corresponding at least one utility power conductor adjacent the utility pole;
   a separable neutral connector between said neutral conductor messenger and a corresponding utility neutral conductor adjacent the utility pole; and
   a mechanical breakaway member between said neutral conductor messenger and the utility pole for breaking away prior to breakage of said neutral conductor messenger to permit preferential separation of said at least one separable power connector and said separable neutral connector based upon increased tension imparted to said neutral conductor messenger.

2. The overhead service drop according to claim 1 wherein said mechanical breakaway member comprises an elongate member comprising opposing ends and a medial portion extending therebetween.

3. The overhead service drop according to claim 2 wherein said elongate member comprises a stranded wire.

4. The overhead service drop according to claim 2 wherein said elongate member comprises a solid body.

5. The overhead service drop according to claim 2 wherein at least one of said opposing ends and medial portion have a predetermined breaking strength.

6. The overhead service drop according to claim 1 wherein said at least one separable power connector comprises male and female mating portions.

7. The overhead service drop according to claim 6 wherein said female mating portion of said at least one power conductor separable connector is attached to said at least one power conductor.

8. The overhead service drop according to claim 6 wherein said female mating portion of said at least one power conductor separable connector comprises a replaceable tubular contact.

9. The overhead service drop according to claim 1 wherein said separable neutral connector comprises male and female mating portions.

10. The overhead service drop according to claim 9 wherein said female mating portion of said neutral conductor separable connector comprises a replaceable tubular contact.

11. The overhead service drop according to claim 1 wherein said at least one power conductor comprises a pair of conductors supported by said neutral conductor messenger to define a triplex service cable.

12. A preferential separation assembly for an overhead service drop extending between a utility pole and a customer location and comprising at least one power conductor, and a neutral conductor messenger supporting itself and the at least one power conductor, the preferential separation assembly comprising:

at least one separable power connector to be connected between the at least one power conductor and a corresponding at least one utility power conductor adjacent the utility pole;

a separable neutral connector to be connected between the neutral conductor messenger and a corresponding utility neutral conductor adjacent the utility pole; and a mechanical breakaway member to be connected between the neutral conductor messenger and the utility pole for breaking away prior to breakage of the neutral conductor messenger to permit preferential separation of said at least one separable power connector and said separable neutral connector based upon increased tension imparted to the neutral conductor messenger.

13. The preferential separation assembly according to claim 12 wherein said mechanical breakaway member comprises an elongate member comprising opposing ends and medial portion extending therebetween.

14. The preferential separation assembly according to claim 13 wherein said elongate member comprises a stranded wire.

15. The preferential separation assembly according to claim 13 wherein said elongate member comprises a solid body.

16. The preferential separation assembly according to claim 13 wherein at least one of said opposing ends and medial portion have a predetermined breaking strength.

17. The preferential separation assembly according to claim 12 wherein said at least one separable power connector comprises male and female mating portions; and wherein said separable neutral connector comprises male and female mating portions.

18. A preferential separation assembly for an overhead service drop extending between a utility pole and a customer location and comprising at least one power conductor, and a neutral conductor messenger supporting itself and the at least one power conductor, the preferential separation assembly comprising:

at least one separable power connector to be connected to the at least one power conductor;

a separable neutral connector to be connected to the neutral conductor messenger; and a mechanical breakaway member to be connected to the neutral conductor messenger for breaking away prior to breakage of the neutral conductor messenger to permit preferential separation of said at least one separable power connector and said separable neutral connector based upon increased tension imparted to the neutral conductor messenger.

19. The preferential separation assembly according to claim 18 wherein said mechanical breakaway member comprises an elongate member comprising opposing ends and medial portion extending therebetween.

20. The preferential separation assembly according to claim 19 wherein said elongate member comprises a stranded wire.

21. The preferential separation assembly according to claim 19 wherein said elongate member comprises a solid body.

22. The preferential separation assembly according to claim 19 wherein at least one of said opposing ends and medial portion have a predetermined breaking strength.

23. The preferential separation assembly according to claim 18 wherein said at least one separable power connector comprises male and female mating portions; and wherein said separable neutral connector comprises male and female mating portions.

24. A method for installing an overhead service drop extending between a utility pole and a customer location comprising at least one power conductor, and a neutral conductor messenger supporting itself and the at least one power conductor, the method comprising:

connecting at least one separable power connector between the at least one power conductor and a corresponding at least one utility power conductor adjacent the utility pole;

connecting a separable neutral connector between the neutral conductor messenger and a corresponding utility neutral conductor adjacent the utility pole; and connecting a mechanical breakaway member between the neutral conductor messenger and the utility pole for breaking away prior to breakage of the neutral conductor messenger to permit preferential separation of the at least one separable power connector and the separable neutral connector based upon increased tension imparted to the neutral conductor messenger.

25. The method according to claim 24 wherein the mechanical breakaway member comprises an elongate member comprising opposing ends and medial portion extending therebetween.

26. The method according to claim 25 wherein at least one of the opposing ends and medial portion have a predetermined breaking strength.

27. The method according to claim 24 wherein the at least one separable power connector comprises male and female mating portions; and wherein the separable neutral connector comprises male and female mating portions.

* * * * *